United States Patent [19]

Clausen

[11] Patent Number: 4,894,743

[45] Date of Patent: Jan. 16, 1990

[54] REPLACEABLE CLEANER/DRIVE MEMBERS FOR A TAPE DRIVE MACHINE

[75] Inventor: Eivind Clausen, Bellingham, Wash.

[73] Assignee: Allsop, Inc., Bellingham, Wash.

[21] Appl. No.: 192,197

[22] Filed: May 10, 1988

Related U.S. Application Data

[63] Continuation-in-part of Ser. No. 818,120, Jan. 10, 1986, Pat. No. 4,816,952.

[51] Int. Cl.⁴ .............................................. G11B 5/41
[52] U.S. Cl. .................................... 360/128; 360/137
[58] Field of Search ..................... 360/132, 137, 128; 15/DIG. 12, DIG. 13, 210 R

[56] References Cited

U.S. PATENT DOCUMENTS

| | | | |
|---|---|---|---|
| 4,454,550 | 6/1984 | Clausen et al. | 360/128 X |
| 4,510,545 | 4/1985 | Boudreau | 360/128 |
| 4,599,669 | 7/1986 | Meermans | 360/128 X |
| 4,763,216 | 8/1988 | Solhjell et al. | 360/128 |
| 4,775,910 | 10/1988 | Rudi | 360/128 |

FOREIGN PATENT DOCUMENTS 0100254  6/1983  Japan ................................. 360/128

Primary Examiner—Stuart N. Hecker
Assistant Examiner—David J. Severin
Attorney, Agent, or Firm—Hughes & Multer

[57] ABSTRACT

A pair of replaceable cleaning cartridges adapted to be inserted alternatively into a cassette cleaner. There is a first cleaning cartridge having a drive element which engages a drive member of the machine to cause a cleaning pad to move on a back and forth cleaning path to clean a read/write head. The second cartridge contains a stationary cleaning pad to engage and clean the drive member of the machine.

11 Claims, 6 Drawing Sheets

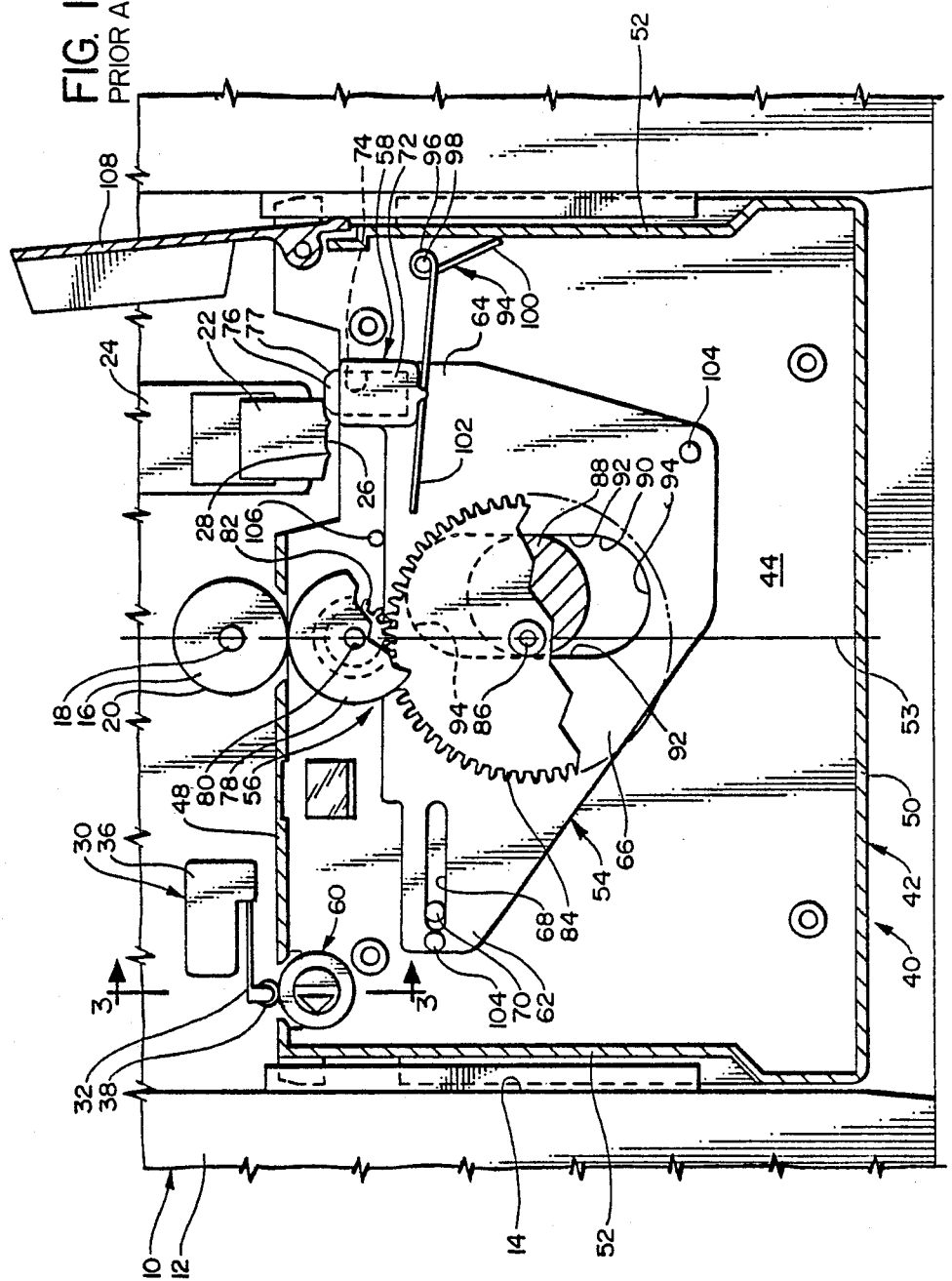

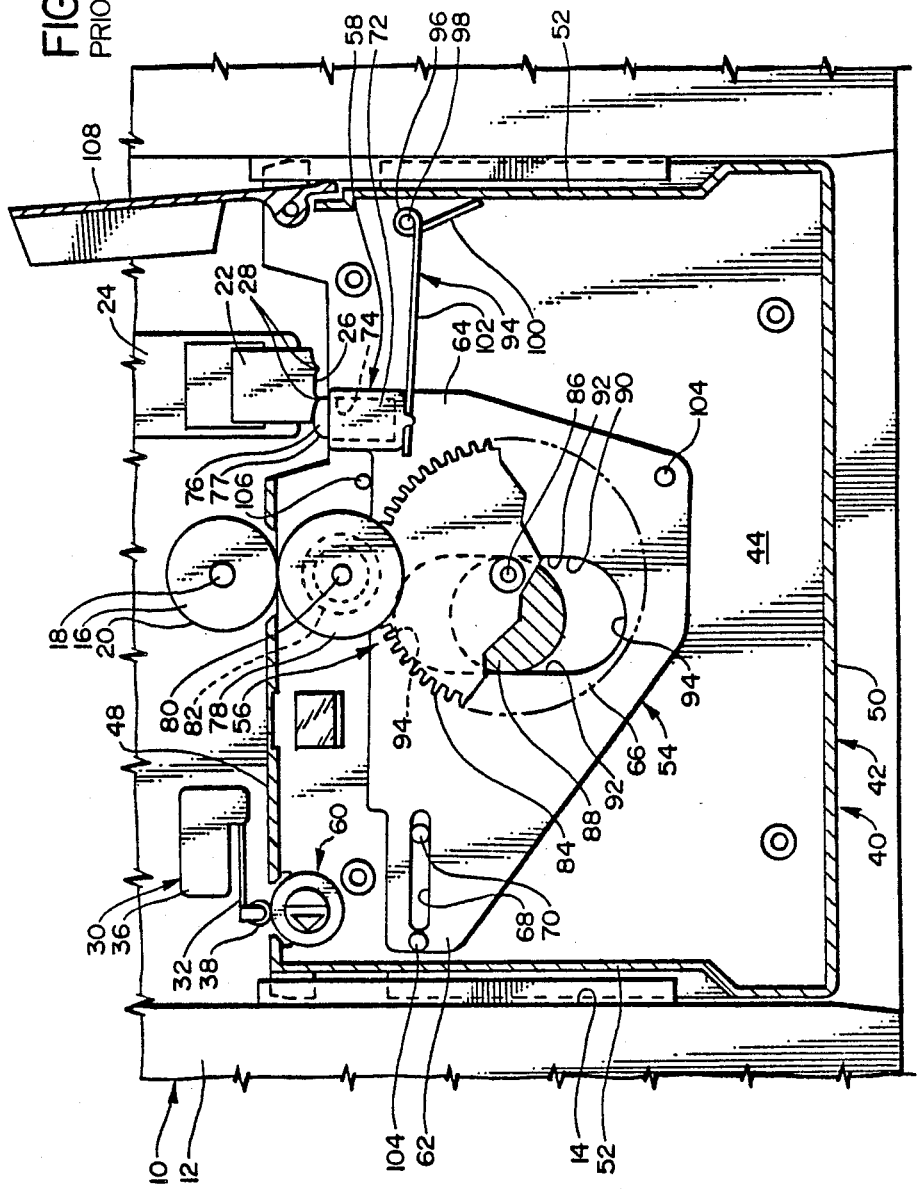

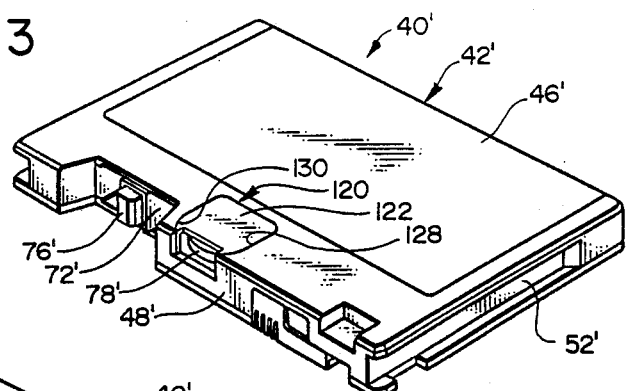
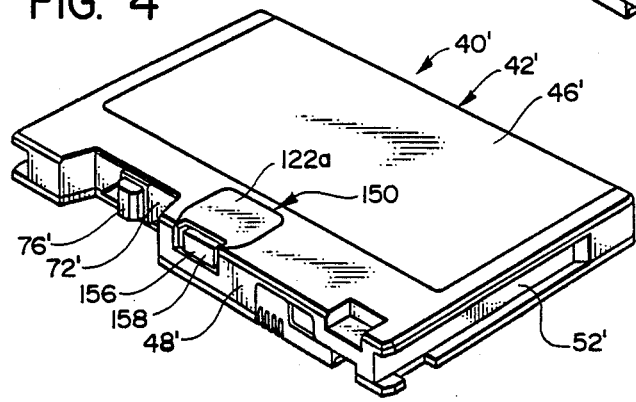
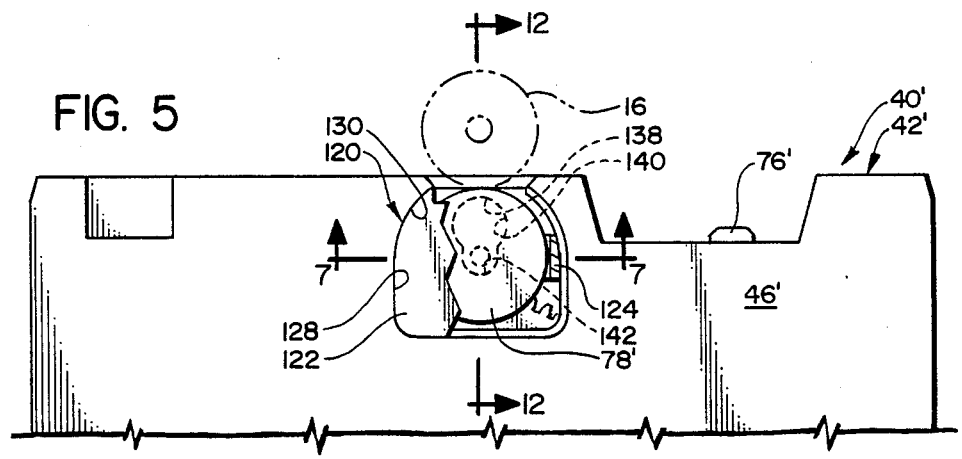

REPLACEABLE CLEANER/DRIVE MEMBERS FOR A TAPE DRIVE MACHINE

CROSS REFERENCE TO RELATED APPLICATIONS

This is a continuation-in-part of U.S. patent application Ser. No. 06/818,120, filed Jan. 10, 1986, entitled "Cleaning Apparatus and Method for a Tape Drive Machine", now U.S. Pat. No. 4,816,952, and the material contained in that application is hereby incorporated herein by reference.

BACKGROUND OF THE INVENTION

1. Field of the Invention

The present invention relates to an apparatus and method for cleaning a drive member and also a read and/or write head of a machine, such as a tape drive, which is adapted to operate on a tape cassette containing a magnetic tape.

2. Background Art

There are various machines which operate to receive information from, or impart information to, magnetic tape. Two such commonly used machines are video player/recorder units and audio player/recorder units. In the video units, the magnetic tape is pulled outwardly from a cassette tape cartridge and brought into engagement with a shallow cylindrical surface of a rotating element on which the player/recorder head is carried. In the audio unit, the magnetic tape generally extends across a forward portion of the tape cassette, with the tape being exposed at this forward portion. The tape passes by a stationary player/recorder head, and is also engaged by a capstan and pinch roller of the machine to cause the tape to move along its length.

Various cleaning devices have been proposed to clean the operating surfaces of such player/recorder units. With the video unit, it has been a common practice to provide a cleaning ribbon which is engaged by guide elements in the video player/recorder unit to carry the cleaning ribbon into engagement with the rotating element carrying the playing/recording head and possibly into engagement with other components of the video player/recorder unit.

Another type of cleaning mechanism which is used more commonly with audio player/recorder units comprises a cassette housing which carries a cleaning member which in turn is adapted to carry a cleaning element, such as a pad. This cleaning member is arranged to move on a cleaning path, which in many cleaning devices is a back and forth path where it wipes against the playing/recording head of the audio unit. Quite commonly, the cleaning member is driven on its back and forth path through a suitable drive transmission from one of the drive spindles in the audio player/recorder unit.

To obtain the proper cleaning action, it is desirable to have adequate frictional engagement between the cleaning pad and the surface of the player/recorder head of the audio unit. However, if the force of the frictional engagement is excessive, then the resistance imparted back through the drive transmission to the drive sprocket may trigger the automatic shutoff mechanism in the machine.

Another concern is that the operating surface of the player/recorder head is quite often not a flat surface, but a moderately curved surface. Also, in some instances, the operating surface of the head may be a compound curved surface, having two side curved portions, with a moderate recess between the two curves. This may have a tendency to create a resisting force against the cleaning pad greater than that would normally be encountered simply from frictional engagement.

Another consideration is that the location of the player/recorder head will vary from machine to machine. Thus, the cleaning element (i.e. usually the cleaning pad) must be mounted in such a way that it can be positioned at different forward to rear locations and still be in proper cleaning engagement with the player/recorder head.

One common means of mounting the cleaning element is to place it on an arm which is pivotally mounted for back and forth motion about a pivot location located in the center portion of the cassette housing. To accommodate different forward to rear locations of the cleaning element, there is sometimes provided a spring arm, which in one form can be a U-shaped spring section, such as shown in U.S. Pat. No. 4,225,893—Loiselle. This same patent shows another method of accommodating this difference in forward to rear location of the cleaning element is to mount the forward to rear lever arm itself by means of a pin and slot connection so that it can be positioned at different forward to rear locations as the pivot arm swings back and forth about the pivot location to accomplish the cleaning motion.

With regard to the problem of the cleaning element being "caught" or "snagged" on the surface of the playing/recording head (e.g. possibly being engaged by a side surface portion of the head so as to create a relatively large resistance to the back and forth movement of the cleaning element), one approach to this problem, as shown in U.S. Pat. No. 4,454,551—Clausen et al, is to provide the arm which carries the cleaning pad with a spring having a somewhat "Z" configuration, where the spring has two oppositely positioned U-shaped spring sections.

In yet other instances, the cleaning element is mounted to a carrier which, instead of a pivot motion, has a linear side to side motion, with the carrier or carriage for the cleaning pad having a laterally extending member mounted between pins. An example of this is shown in U.S. Pat. No. 4,442,468—d'Alayer de Costemore d'Arc.

In addition to video and audio playing/recording units, there are also tape drives which move a magnetic tape relative to a read/write head so that data can be taken from the tape or transmitted to the tape. In one such tape drive, which is sold by Hewlett Packard as the HP 9144A Tape Drive, there is provided a read/write head which is positioned at a front side location relative to the tape cassette, and the operating surface of this head has a pair of vertically oriented ridges which protrude outwardly from the operating surface a short distance. With regard to cleaning such a read/write head, for example by a back and forth motion of a pad, these ridges aggravate the problem of the cleaning pad encountering an excessive resisting force by the pad coming into engagement with the side surfaces of these ridges.

In this tape drive machine, there is a drive wheel (i.e. a capstan) which engages a drive element in the tape cassette to cause movement of the tape. The operation of the machine is such that the motion imparted to the tape is a somewhat erratic back and forth motion.

In the parent application noted above, U.S. Ser. No. 818,120, now U.S. Pat. No. 4,816,952 there is described a cassette cleaner to clean the read/write head of the tape drive machine, such as a Hewlett Packard machine described above. There is a cassette housing having a carriage mounted for lateral back and forth movement in the housing. The carriage has a slot and pin mounting at a left forward location, and a cleaning pad at a right forward location, with a gear and cam transmission to cause the lateral back and forth motion of the carriage. Power to the gear and cam transmission is supplied by a drive wheel 78 which engages a drive capstan or roller 16 which is a component of the tape drive machine.

While the cassette cleaner described in U.S. Ser. No. 818,120 effectively accomplishes its intended function, there is still the problem of cleaning the capstan or drive roller of the tape drive machine.

A search of the U.S. Patent literature has disclosed a number of patents relating generally to devices for cleaning a capstan or similar device, and these are listed below.

U.S. Pat. No. 4,631,616 (Zago et al) shows a cleaner where there is rotatable cleaning element driven by rotation of the spindles of the machine.

U.S. Pat. No. 4,599,669 (Meermans) shows a cassette cleaner where a cleaning pad engages the capstan, and a spring device urges the cleaning pad into engagement with the capstan.

U.S. Pat. No. 4,510,545 (Boudreau) shows a capstan cleaning device in which the cleaning pad is mounted in a cassette case. There is a flexible band 12 which is manually accessible for pulling, and which has a forward portion which engages the cleaning pad. By pulling on this band 12, the cleaning pad is brought into frictional engagement with the capstan 10.

U.S. Pat. No. 4,458,281 (Kara) shows a cleaning device where there is a cassette housing which can be placed in a first position where a drive roller 57 engages the capstan so as to drive a rotatable cleaning roller 72 that in turn wipes against the playing/recording head. Then the cassette housing can be inverted so that a cleaning pad 80 is positioned against the capstan so as to clean the capstan when the capstan rotates.

U.S. Pat. No. 4,272,796 (Van Kreuningen et al) shows a cassette cleaner where there is a pad 30a which is urged against the capstan so as to clean the same.

U.S. Pat. No. 4,225,893 (Loiselle) shows a cassette cleaner where there is provided a capstan and pinch roller cleaner, in the form of a pad which is urged by a spring into cleaning engagement.

U.S. Pat. No. 4,141,053 (Kara) shows a head and capstan cleaner in which the head cleaning roller 62 is driven through gears by the capstan 16. The capstan 16 is then cleaned by causing it to be engaged with a cleaning pad 88, this being accomplished by inverting the cassette cleaner from its first position.

U.S. Pat. No. 3,761,994 (Becht) shows a cleaning device where there is a pad 34 which bears against the capstan so as to clean the same. The head is cleaned by a hand-operated pad.

U.S. Pat. No. 3,655,924 (Puskas) shows a pickup head demagnetizer. The drive capstan of the player drives a carrier on which magnets are mounted, with the carrier rotating so as to produce an alternating magnetic field to cause the demagnetization.

SUMMARY OF THE INVENTION

The apparatus of the present invention is arranged to perform a cleaning operation on a machine which receives data from and/or imparts data to a magnetic tape, where the machine comprises:

a. a structure defining an operation location to receive a tape cassette, said operating location having a front area, a rear area and first and second side areas;

b. a read and/or write head located at the front area, with the head having a rearwardly facing operating surface, positioned to operatively engage a magnetic tape in the tape cassette;

c. a drive system comprising a drive member to move the magnetic tape by the head.

The apparatus comprises a main housing having a configuration to fit within the operating location in an operating position. The main housing has a forward portion, a rear portion, first and second side portions, a center portion, and a longitudinal center axis extending from the front portion, to the center portion to the rear portion.

There is a cleaning member mounted in the main housing so as to be movable on a cleaning path to clean said head. There is a drive means positioned in the main housing to operatively engage the drive member so as to be driven thereby, so as to move the cleaning member on the cleaning path.

There is provided a first drive cartridge adapted to be removably mounted in the main housing at a cartridge location and having a drive element to form a drive connection between the drive member and the drive means so as to cause the cleaning member to move on the cleaning path.

A second cleaning cartridge is also provided, this second cleaning cartridge being adapted to be removably mounted in the housing at the cartridge location in place of the first cartridge. This cleaning cartridge has a cleaning pad means to engage the drive member so as to clean the drive member.

In the preferred form, the drive element is rotatably mounted in the drive cartridge. The cleaning pad means is located at a stationary position within the cleaning cartridge. Also in the preferred configuration, the drive element comprises a first wheel portion adapted to engage the drive member of the machine, and also comprises a second wheel portion connected to the first wheel portion and rotatable therewith. More specifically, the drive means comprises a gear drive transmission, and the second wheel portion is a gear member engaging a gear of the drive means. Also, in the particular embodiment shown herein, the drive means comprises a gear rotatably mounted at the center portion of the main housing, and the drive cartridge is arranged to be positioned at a forward central portion of the main housing forwardly of the gear of the drive means.

Also in the preferred form, each of the cartridges comprises a cartridge housing having an outer wall portion configured to fit in a matching recess in one wall of the main housing. Further, each cartridge comprises a retaining portion adapted to engage a second wall of the main housing positioned oppositely of the the one wall of the main housing. Specifically, the retaining portion is adapted to fit into a retaining recess formed in the second wall of the main housing. The retaining portion forms with the second wall of the main housing engaging groove and recess means to secure the cartridge housing to the main housing. More specifically, the retaining recess in the second wall has a first retaining recess portion of a larger diameter to receive the retaining portion of each cartridge, and a second retaining recess portion of a smaller diameter to retain the retaining portion of each cartridge.

Other features will become apparent from the following detailed description.

BRIEF DESCRIPTION OF THE DRAWINGS

FIG. 1 is a top elevational view of a portion of a prior art tape drive unit, with the cleaning apparatus described in U.S. patent application Ser. No. 06/818,120 mounted in its operating position in the tape drive unit, and with the carriage of the cleaning apparatus being shown at its far right position;

FIG. 2 is a view similar to FIG. 1, but showing the carriage at its extreme left hand position;

FIG. 3 is an isometric view of the present invention where a first replaceable drive cartridge is inserted in the cassette housing to provide a drive connection to the cleaning pad for the read/write head;

FIG. 4 is an isometric view similar to FIG. 3 but with a second cleaning cartridge mounted in place of the first drive cartridge to accomplish a cleaning of a drive wheel of the machine;

FIG. 5 is a top plan view of the cassette cleaner as shown in FIG. 3, with the drive cartridge inserted;

DESCRIPTION OF THE PREFERRED EMBODIMENTS

Figure 6:
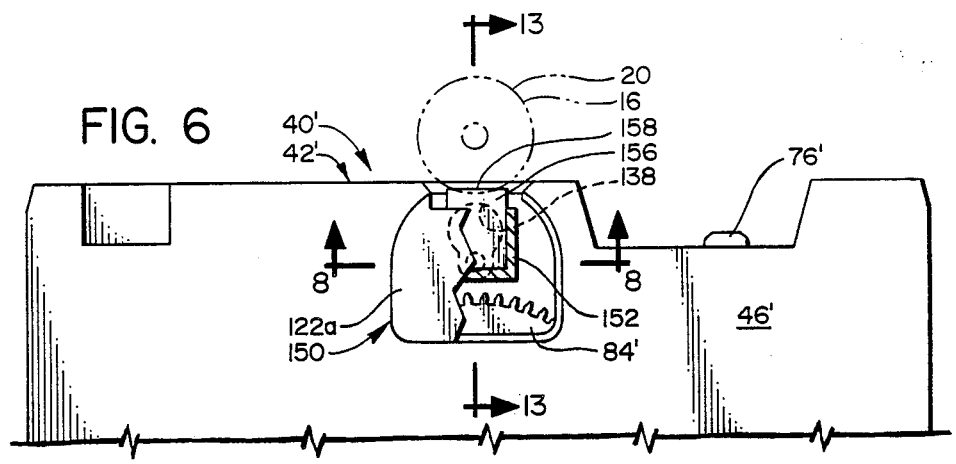
FIG. 6 is a view similar to the FIG. 5, but showing the present invention with the cleaning cartridge of FIG. 4 in place so as to come into cleaning engagement with the drive capstan or roller.

In FIGS. 1 and 2, there is shown a portion of a tape drive unit 10, such as the tape drive unit mentioned previously herein, produced by Hewlett Packard. Only those components of the unit 10 are shown which are directly relevant to the operation of the present invention.

The tape drive unit 10 comprises a containing structure (a portion of which is shown at 12) which defines a generally rectangular containing area 14 and which in the normal operation of the unit 10 contains a prior art tape cassette, having a particular configuration to operate in this unit 10. The unit 10 has a tape drive system which comprises a drive wheel or capstan 16 that is located at the forward middle portion of the containing area 14 and is mounted for rotation about a vertical center axis 18, this capstan having a cylindrical drive surface 20. In the usual operation of the unit 10, the drive surface 20 engages a circular drive element positioned within the magnetic tape cartridge which in turn causes the travel of a drive ribbon that engages the tape on the two spools in the housing.

At the forward right hand portion of the containing area 14, there is a read/write head 22 mounted to a carrying structure 24. This head 22 has a rearwardly facing operating surface 26 which is adapted to come into operating engagement with the magnetic tape. The operating surface 26 is formed with two vertically aligned and laterally spaced ridges 28 which protrude a short distance outwardly from the operating surface 26. The read/write head 22 in this particular machine has up and down movement, but no forward to rear movement. In other machines, the head could be made movable between a retracted position and an operating position. In FIGS. 1 and 2, the head 22 is shown in its operating position where it extends a short distance into the containing area 12. If the head 22 has a retracted position, the head 22 is, when retracted, positioned at a more forward location.

At the left side of the forward part of the containing area 14, there is a control switch mechanism 30 comprising upper and lower switch elements 32 pivotally mounted at inner ends to a switch structure 36. At the opposite ends of the switch elements 32, there are respective contact discs 38. In the normal operation of the tape drive unit 10, these switch elements 32 are selectively located by a positioning device in the magnetic tape cartridge to affect operation of the tape drive unit 10. For example, with the switch elements 32 in one position, the tape drive unit 10 could be prevented from erasing information contained on the magnetic tape.

It is to be understood that the tape drive unit 10 and its components 12-38 described above already exist in the prior art. The present invention is particularly adapted to operate in this tape drive unit 10 to clean the operating surface 26 of the read/write head 22 to clean the drive surface 20 of the capstan 16, and to be compatible with the tape drive unit 10.

Prior to describing the present invention, there will be a description of the apparatus described in U.S. patent application Ser. No. 06/818,120 with reference to FIGS. 1 and 2. The preferred emobdiments of the present invention described herein is particularly adapted to be incorporated in an apparatus such as that shown in FIGS. 1 and 2.

There is a cartridge 40 comprising a housing 42 having an overall rectangular configuration generally similar to that of a tape cassette normally used with the tape drive unit 10. More specifically, this housing 42 comprises a bottom wall 44, top wall (not shown in FIGS. 1 and 2 for ease of illustration, front wall 48, rear wall 50 and right and left side walls 52.

In describing the apparatus of FIGS. 1 and 2, the cartridge 40 will be considered as having a forward portion, a rear portion, and first and second side portions, corresponding to the locations of the front wall 48, rear wall 50, and the right and left side walls 52, respectively. Further, the cartridge 40 will be considered as having a longitudinal center axis 53 (see FIG. 1) which extends in a forward to rear direction through the center portion of the cartridge 40.

The main operating components of the cartridge 40 are a carriage 54 mounted in the housing 42 for side to side motion, a drive transmission 56 arranged to engage the capstan 16 to cause the side to side motion of the carriage 54, a cleaning device 58 mounted to the carriage 54 so as to be in cleaning engagement with the operating surface 26 of the read/write head 22, and a switch locating device 60 adapted to properly position the switch elements 32 and 34.

To described the carriage 54 more specifically, this carriage 54 has a generally planar plate-like configuration and rests on the bottom wall 44. The carriage 54 has a left mounting end portion 62, a right cleaning end portion 64, and an intermediate drive engaging portion 66.

The left mounting portion 62 of the carriage 54 is formed with a laterally extending through slot 68 to receive an upright pivot pin 70 connected to and extending upwardly from the bottom wall 44 of the housing 42. This slot and pin connection 68-70 serves the function of locating the left mounting portion 62 of the carriage 54, and also acts as a pivot location to permit limited fore and aft movement of the right cleaning end portion 64 of the carriage 54.

At the forward end of the right end portion 64 of the carriage 54, there is a rectangularly shaped cleaning member 72 which defines a forwardly facing open recess 74 to receive therein a cleaning pad 76. The pad 76 extends a short distance beyond the forward edges of the cleaning member 72 so as to be able to come into engagement with the operating surface 26 of the read/write head 22. The forward surface of the pad 76 has its side edges slanted, as at 77, at about a 45° angle from the longitudinal axis 53, so as to enhance the cleaning action of the pad 76 against the head surface 26.

The aforementioned drive transmission 56 comprises a first drive element in the form of a drive wheel 78 positioned at the forward middle portion of the housing 42 and mounted for rotation about its vertical center axis by means of a pin 80 connected to the housing 42. Located below and fixedly connected to the drive wheel 78 is a first gear 82 of a relatively small diameter, which gear 82 meshes with a larger gear 84 positioned rearwardly of the gear 82 and centrally located in the housing 42 on the axis 53. This gear 84 is mounted to a pin 86 in the housing 42 for rotation about its vertical center axis.

The larger gear 84 is fixedly connected to a circular cam 88 that is mounted eccentrically from the center pin 86 about which the gear 84 rotates. This circular cam 88 fits within a longitudinally extending cam slot 90 formed in the plate-like portion of the carriage 54. More specifically, this cam slot 90 is defined by two longitudinally aligned side edges 92 spaced from one another by a lateral distance just slightly larger than the diameter of the circular cam 88. The forward and rear ends of the edges 92 are connected by upper and lower circular edges 94.

It is apparent from examining FIGS. 1 and 2 that as the drive wheel 78 is turned by the capstan 16, the gear 82 causes a corresponding rotation of the gear 84 to cause the cam 88 to act in the cam slot 90 to cause a side to side reciprocating motion of the carriage 54. In FIG. 1, the cam 88 is positioned so that it has moved the carriage 54 to its extreme right hand position, while in FIG. 2, the cam has rotated 180° from the position of FIG. 1 so as to move the carriage 54 to its extreme left hand position.

To urge the right end cleaning portion 64 of the carriage 54 forwardly so as to be in proper engagement with the read/write head 22, there is provided a spring member 94 which is in the form of an elongate resilient rod looped at 96 around a pin 98, and having one arm 100 engaging the right side wall 52, and a second arm 102 engaging a rear end of the U-shaped cleaning member 72. More specifically, the elongate end portion 102 of the spring 94 fits into a small rearwardly facing slot so as to permit relative slide movement between the cleaning member 72 and the spring arm 102 so as to permit the back and forth movement of the carriage 54.

Suitable stop members and locating members are provided. More specifically, the carriage 54 has two upstanding locating pins 104, the upper ends of which are positioned closely adjacent to the top wall 46. A stop pin 106 is positioned to engage the front edge of the carriage 54 and limit the forward movement of the carriage 54, and a suitable stop member (not shown for convenience of illustration) is provided to limit the rearward movement of the carriage 54.

It will be noted that at the right front corner of the housing 42 there is a hinge mounted door 108. This is provided primarily to make the cartridge 40 compatible with this particular tape drive unit 10, since the tape cassette which is normally used in the unit 10 has a similar door. However, it is possible that this door 108 could be eliminated.

The switch locating device 60 is not critical to the present invention, so this will not be described herein. Further such a switch locating device is described adequately in U.S. patent application Ser. No. 06/818,120.

The cleaning cartridge 40 is inserted into the operating area 14 of the tape drive unit 10, this being accomplished in generally the same manner as a conventional magnetic tape cassette is inserted into the unit 10. Then the tape drive unit 10 has its operating knob, button or lever manipulated to cause the unit 10 to operate. In this particular unit 10, the operation is such that the capstan or drive wheel 16 will rotate at a relatively rapid rate of rotation intermittently in one direction or the other.

As the capstan 16 rotates, it acts through the drive wheel 78 and the two gears 82 and 84 to cause rotation of the cam 88 that is fixedly mounted eccentrically to the gear 84. It is apparent that the gears 82 and 84 provide a speed reducing transmission so that the rotation of the cam 88 is a fraction of the speed of rotation of the capstan 16. The rotation of the cam 88 causes the reciprocating motion of the carriage 54 in the manner described above.

When the tape drive unit 10 is operated, the read/write head 22 of this particular machine is moved by the unit 10 upwardly and downwardly in the position as shown in FIGS. 1 and 2. In this position, the operating surface 26 of the head 22 comes into engagement with the forward cleaning surface of the pad 76.

When the rotation of the capstan 16 causes the back and forth motion of the carriage 54, the pad 76 wipes in a back and forth motion over the surface 26 of the head 22. The spring member 94 urges the cleaning member 72 forwardly with a moderate force so that there is the proper frictional engagement between the cleaning pad 76 and the surface 26.

Normally a cleaning solution is applied to the pad 76, and this pad 76 can be replaced periodically.

Figure 2A:
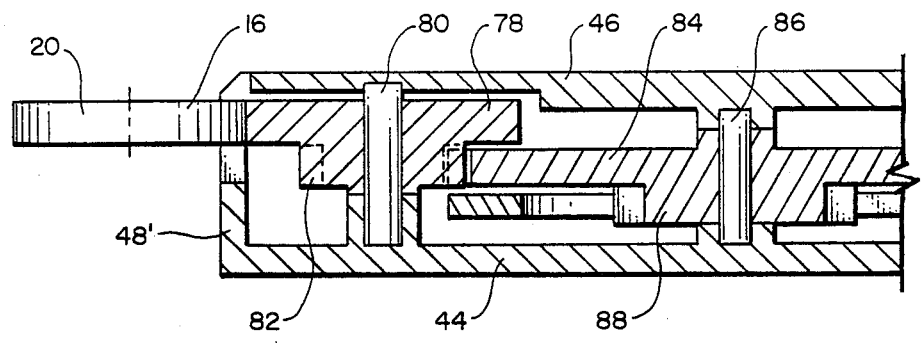
FIG. 2A is a sectional view taken along line 2A—2A of FIG. 1.
Figure 12:
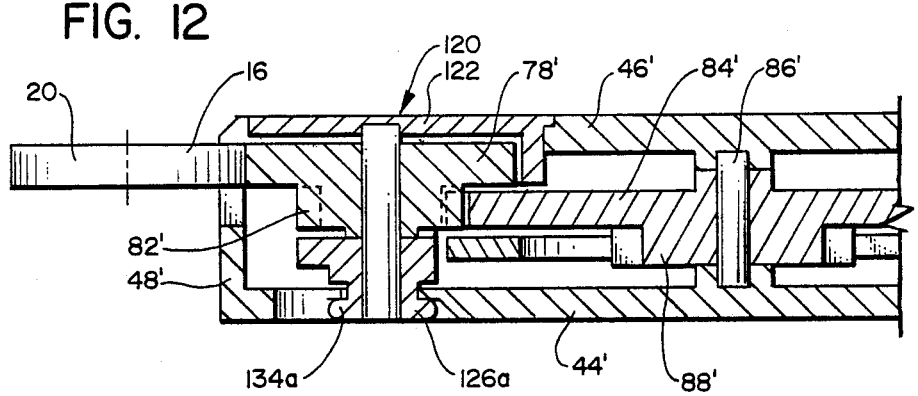
FIG. 12 is a sectonal view taken along line 12—12 of FIG. 5.
Figure 13:
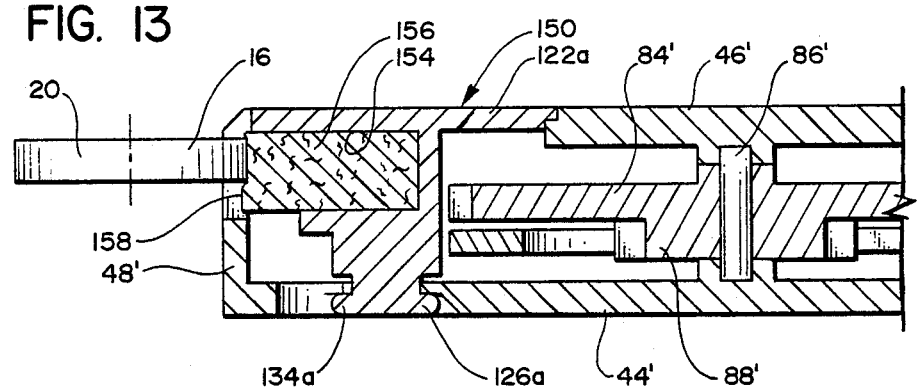
FIG. 13 is a sectonal view taken along line 13—13 of FIG. 6.

While the apparatus of FIGS. 1 and 2 functioned quite well to accomplish the cleaning of the read/write head 22, there was no provision for cleaning the capstan or driver roller 16. The present invention, which will be described herein with reference to FIGS. 3 through 12 is particularly designed to be incorporated in a cassette cleaner, such as the one shown in FIGS. 1, 2 and 2A, where there is permitted the proper operation of the cleaning of the read/write head, but there is also provided means for cleaning the drive member of the tape drive unit 10. It is to be understood that, while the present invention is described in connection with this particular tape drive unit 10, the basic operating components of the present invention could be used in another type of cassette cleaner where there is a drive member in the machine to cause the cleaning motion of the member to clean one component, and where the drive member which causes that cleaning motion needs also to be cleaned.

In describing the present invention, components which are similar to the components of the apparatus of FIGS. 1 and 2 will be given numerical designations corresponding to such similar components, with a prime (') designation distinguishing those of the present invention.

There is a cartridge 40' comprising a housing 42' having a rectangular configuration similar to the housing 42. This housing 42' comprises a bottom wall 44', a top wall 46', a front wall 48', a rear wall (not shown in FIGS. 3 through 11 for ease of illustration) and right and left sidewalls 52'.

It is to be understood that the present invention comprises a carriage, a drive transmission, and a cleaning device mounted to the carriage. These can be substantially the same as, or similar to, the corresponding components 54, 56 and 58, respectively, which are described with reference to FIGS. 1 and 2. The forward portion of the cleaning device is shown at 72', and this carries a cleaning pad 76' for the read/write head 22. The drive transmission of the present invention is arranged substantially the same as illustrated in FIGS. 1 and 2, and it can be seen in FIG. 6 that there is a relatively large gear 84'. It is to be understood that this gear 84' is operatively engaged to a cam, such as shown at 88 in FIGS. 1 and 2, that in turn engages a carriage (such as the carriage 54) to cause the back and forth motion of the cleaning pad 76'.

In the present invention, there is provided a drive connection between the capstan 16 and the gear 84' that is replaceable with a cleaning device for the capstan 16, and these are provided in the form of two replaceable cartridges which can be used in place of one another, depending upon the function desired. This will be described further below.

Figure 7:
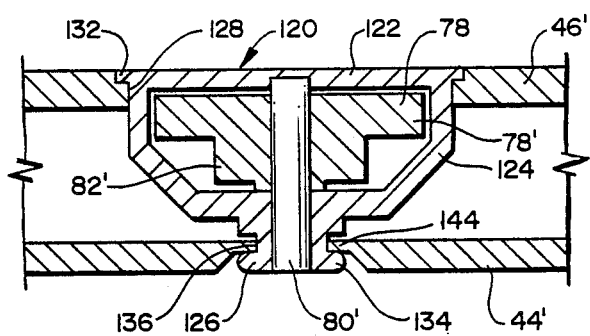
FIG. 7 is a sectional view taken along line 7—7 of FIG. 5.

In FIGS. 3, 5 and 7, there is shown the cleaning cartridge 40' having a replaceable drive cartridge 120 mounted therein. This drive cartridge 120 has an upper wall 122 which in the operating position is coplanar with the top wall 46' of the housing 42', a sidewall 124 and a lower retaining portion 126. There is a pin 80' extending vertically between the retaining portion 126 and the top wall 122. Rotatably mounted to this pin 80' is a drive wheel 78' which is fixidly connected to a gear 82' that is positioned immediately below the wheel 78' and thus also rotatably mounted around the pin 80'.

In the installed position of FIGS. 3, 5 and 7, the drive wheel 78' and the gear 82' serve the same functions as their corresponding components (i.e., the drive wheel 78 and the gear 82) of the apparatus shown in FIGS. 1 and 2. More specifically, the drive wheel 78' engages the capstan 16 so as to rotate in response to the rotation of the capstan 16, thus causing the gear 82' to rotate the larger gear 84' and cause the back and forth motion of the carriage that in turn causes the cleaning pad 76' to move back and forth.

To enable the drive cartridge 120 to be removably mounted to the cassette housing 42' in a secure fashion, a forward portion of the upper wall 46' is provided with a generally rectangularly shaped cutout 128 which has forward edge portions 130 thereof tapered toward one another, and the cartridge wall 122 has the same configuration as this cutout 128. The upper peripheral edge of the cutout 128 is formed with an upper edge notch or peripheral recess to receive a peripheral lip 132 (see FIG. 7) of the top wall 122.

The aforementioned retaining portion 126 comprises a downwardly extending hub 134 which is slotted at 136 along its side edges (see FIG. 7). The bottom wall 44' is formed with a key-shaped cutout 138 (see FIG. 5) in the form of a forward portion 140 of a larger diameter, and a rear portion 142 of a smaller diameter. The retaining portion 126 is brought into engagement in this key-shaped cutout 138 by inserting the retaining portion downwardly into the cutout area 140 of a greater diameter, and then moving the cartridge 120 rearwardly so that the slots 136 come into retaining engagement with a retaining lip 144 that engages the slots 136.

Figure 8:
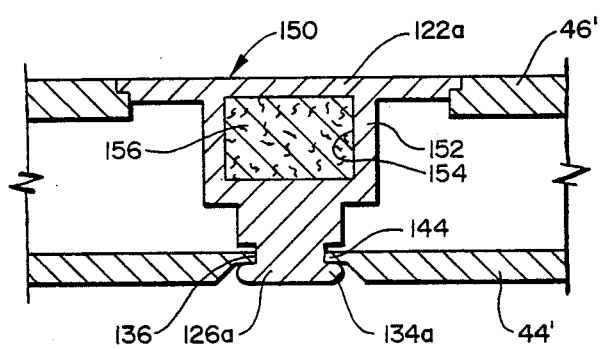
FIG. 8 is a view taken along line 8—8 of FIG. 6.

There is a second cleaning cartridge 150, illustrated in FIGS. 4, 6 and 8. Components of this cleaning cartridge 150 which are similar to components of the drive cartridge 120 will be given like numerical designations, with an "a" suffix distinguishing those components of the cleaning cartridge 150. Thus, the cleaning cartridge 150 has a top wall 122a and a bottom retaining portion 126a. The upper wall 122a has the same configuration as the wall 122 of the drive cartridge and fits in the same cutout 128. In like manner, the retaining portion 126a functions to engage the retaining lips 144 that define the smaller diameter portion 142 of the cutout 138.

The cleaning cartridge 150 has a side wall 152 which defines a rectangular slot or chamber 154 in which is positioned a cleaning pad 156. This cleaning pad 156 has a front surface 158 which is positioned to engage the cylindrical side surface 20 of the capstan 16.

To describe the operation of the present invention, let it be assumed that the cleaning cartridge 40 is to be arranged so that the cleaning pad 76' can perform its cleaning function on the read/write head 22. For this mode of operation, the removable drive cartridge 120 is positioned in the cassette housing 42 as illustrated in FIGS. 3, 5 and 7. As indicated previously, the drive wheel 78' and the gear 82' function in substantially the same manner as described with reference to FIGS. 1 and 2 to cause the reciprocating motion of the pad 76'.

Let it now be assumed that the cleaning operation of the read/write head 22 has been completed, and it is desired to clean the drive wheel or capstan 16. The drive cartridge 120 is removed, and this can conveniently be accomplished in the manner illustrated in FIG. 9. The cartridge 40 is inverted and the person simply manually engages the retaining portion 126 to push this forwardly and downwardly to a moderate extent so that the front edge of the upper wall 122 clears matching edge portions of the cutout 128 and permits the cartridge 120 to be moved forwardly. When the retaining portion 126 is positioned within the larger diameter portion 140 of the cutout 138, the cartridge 120 can simply be lifted out of the housing 42.

Figure 10:
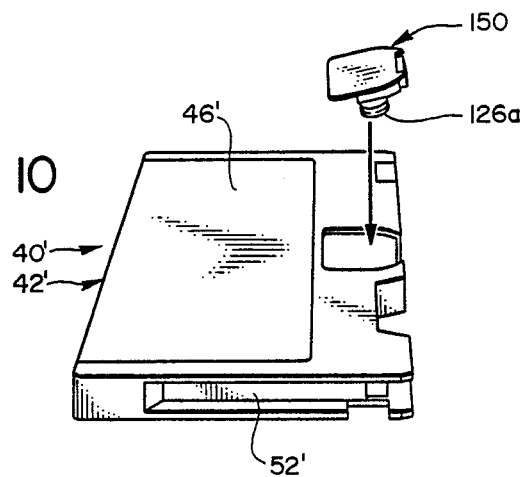
FIG. 10 is a view similar to FIG. 9, but showing the top surface of the cassette housing, and illustrating the manner in which the cleaning cartridge is to be inserted at the cartridge location.
Figure 11:
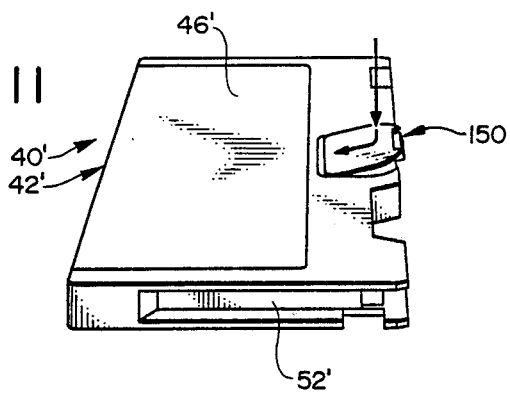
FIG. 11 is a view similar to FIG. 10, further illustrating how the cleaning cartridge is inserted into the cassette housing at the cartridge location.

Then the cleaning cartridge 150 is inserted into the cutout or recess 28, this being accomplished in the manner illustrated in FIGS. 10 and 11. More specifically, the cartridge 150 is moved downwardly toward the top surface 46' of the cassette housing 42', with the lower retaining portion 126a moving into the larger diameter portion 140 of the cutout 138. Then the cleaning cartridge 150 is pushed rearwardly so that the retaining portion 126 comes into proper engagement with the retaining lips 142.

With the cleaning cartridge 150 in place, the cleaner 40' is inserted into the containing area 14 of the tape drive unit 10 in the same manner as described previously, and the tape drive unit 10 is operated so that the drive wheel 16 or capstan rotates. The rotation of the capstan 16 causes a wiping action against the surface 158 of the pad 156, so that the surface 20 of the drive wheel 16 is cleaned. Since there is no driving engagement to the gear 84', there is no back and forth movement of the cleaning pad 76'.

Figure 9:
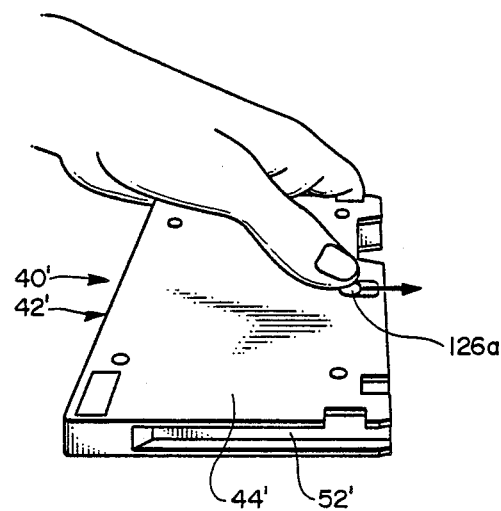
FIG. 9 is a prospective view showing the manner in which a person removes the drive cartridge from the cassette housing, with the bottom surface of the cassette housing being shown.

After the cleaning operation of the wheel member 16 is accomplished, then the cleaning cartridge 150 can be removed from the housing 42' in the same manner as described above with reference to the drive cartridge 120 (see FIG. 9).

It is to be recognized that various modifications could be made to the present invention without departing from the basic teachings thereof. For example, while a particular form of retaining means 126 is shown, other retaining means could be provided so that the cartridges 120 and 150 could be easily inserted into, and removed from, the housing 42, while still being securely held therein. Also, as indicated previously, even though the present invention is particularly adapted to be used effectively in combination with the cassette cleaner, such as shown in FIGS. 1 and 2, within the broader aspects of the present invention, these components could be arranged to be utilized with other cassette cleaners where it is desired to utilize a component of the machine to cause one cleaning portion to be moved on a cleaning path, while providing means for also cleaning the component which supplies power to the cassette cleaner.

Also, various modifications could be made to the present invention without departing from the basic teachings thereof.

What is claimed is:

1. An apparatus to perform a cleaning operation on a machine which receives data from and/or imparts data to a magnetic tape, where the machine comprises:
   a. a structure defining an operation location to receive a tape cassette, said operating location having a front area, a rear area and first and second side areas;
   b. a read and/or write head located at the front area, with the head having a rearwardly facing operating surface, positioned to operatively engage a magnetic tape in the tape cassette;
   c. a drive system comprising a drive member to move the magnetic tape by the head;

said apparatus comprising:
   a. a main housing having a configuration to fit within said operating location in an operating position, said main housing having a forward portion, a rear portion, first and second side portions, a center portion, and a longitudinal center axis extending from the front portion, through the center portion to the rear portion;
   b. a cleaning member mounted in said main housing to be movable on a cleaning path to clean said head;
   c. drive means positioned in said housing to operatively engage said drive member so as to be driven thereby, to move said cleaning member on said cleaning path;
   d. a first drive cartridge adapted to be removably mounted in said main housing at a cartridge location and having a drive element to form a drive connection between said drive member and said drive means to cause the cleaning member to move on said cleaning path;
   e. a second cleaning cartridge adapted to be removably mounted in said main housing at said cartridge location in place of said first cartridge and having a cleaning pad means to engage said drive member to clean the drive member.

2. The apparatus as recited in claim 1, wherein said drive element is rotatably mounted in said drive cartridge.

3. The apparatus as recited in claim 2, wherein said cleaning pad means is located at a stationary position within said cleaning cartridge.

4. The apparatus as recited in claim 2, wherein said drive element comprises a first wheel portion adapted to engage the drive member of the machine, and also comprises a second wheel portion connected to said first wheel portion and rotatable therewith.

5. The apparatus as recited in claim 4, wherein said drive means comprises a gear drive transmission, and said second wheel portion is a gear member engaging a gear of said drive means.

6. The apparatus as recited in claim 5, wherein said drive means comprises a gear rotatably mounted at the center portion of said main housing, and said drive cartridge is arranged to be positioned at a forward central portion of said main housing forwardly of said gear of the drive means.

7. The apparatus as recited in claim 1, wherein each of said drive cartridge and said cleaning cartridge comprises a cartridge housing having an outer wall portion configured to fit in a matching recess in one wall of said main housing.

8. The apparatus as recited in claim 7, wherein each of said drive cartridge and said cleaning cartridge comprises a retaining portion adapted to engage a second wall of said main housing positioned oppositely of said one wall of said main housing.

9. The apparatus as recited in claim 8, wherein said retaining portion is adapted to fit into a retaining recess formed in the second wall of the main housing.

10. The apparatus as recited in claim 9, wherein said retaining portion forms with said second wall of the main housing engaging groove and recess means to secure each of said cartridge housings to said main housing.

11. The apparatus as recited in claim 10, wherein the retaining recess in said second wall has a first retaining recess portion of a larger diameter to receive the retaining portion of each cartridge, and a second retaining recess portion of a smaller diameter to retain the retaining portion of each cartridge.

* * * * *